Patented Mar. 17, 1953

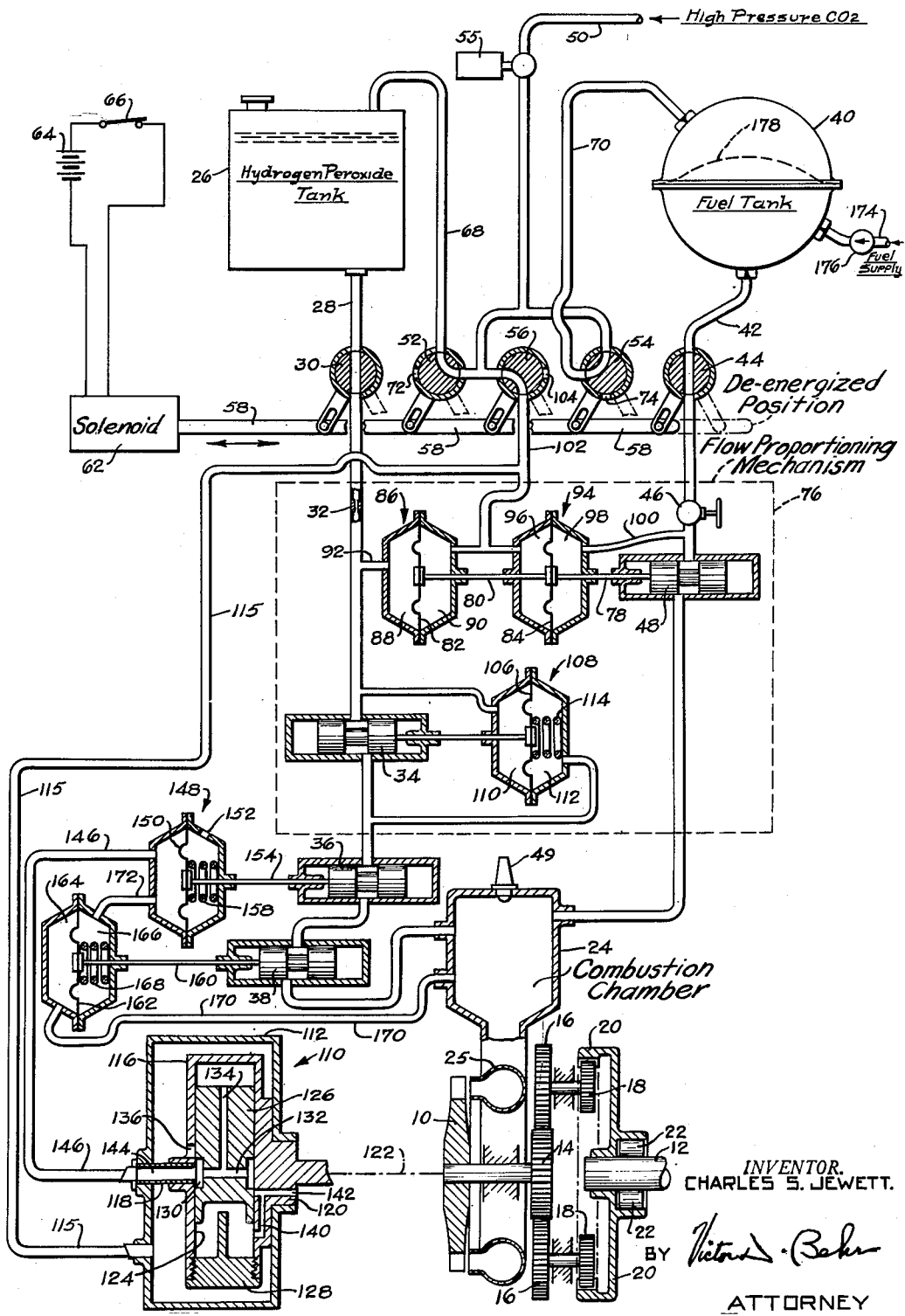

2,631,426

UNITED STATES PATENT OFFICE 2,631,426

ENGINE STARTING TURBINE HAVING COMBUSTION ELEMENT SUPPLIED THERETO IN RESPONSE TO SPEED AND COMBUSTION CHAMBER PRESSURE

Charles S. Jewett, Ramsey, N. J., assignor to Curtiss-Wright Corporation, a corporation of Delaware Application July 7, 1948, Serial No. 37,404

15 Claims. (Cl. 60—39.14)

This invention relates to engines and is particularly directed to starting apparatus for cranking or turning over large aircraft engines.

The conventional form of aircraft engine starter comprises an electric motor arranged to receive its energy from an electric battery. Modern large aircraft engines, however, require such large amounts of energy for starting that this conventional form of starter is impractical. This is particularly true of gas turbine engines which, in contrast with reciprocating engines, must be cranked at high speeds, in the neighborhood of 1000 to 2000 R. P. M., by the starting apparatus. An object of this invention comprises the provision of novel starting apparatus capable of quickly bringing such an engine up to its required starting speed. A further object of the invention comprises the provision of starting apparatus having means for automatically controlling the magnitude of its torque output.

The engine starting apparatus should be capable of bringing the engine up to its required starting speed in as short a time as possible and at the same time the output torque of said apparatus should be kept below a predetermined upper limit in order not to overload the gears and other transmission means of the engine. Specifically, the starting apparatus of the invention comprises a single-stage impulse-type gas turbine engine with control means therefor. It has been determined that, if the temperature of its motive fluid is constant, the torque output of such an engine remains substantially constant, regardless of variations in its speed, if the pressure of its motive fluid is varied approximately as the square of its speed. Accordingly it is a further object of the invention to provide automatic means for controlling the pressure of the motive fluid of the starting turbine with changes in its speed.

A still further object of the invention relates to the mixture supplied to the combustion chamber of the gas turbine starter engine for combustion therein. Applicant has determined that a combustion mixture comprising gasoline or other hydrocarbon fuel and hydrogen peroxide, having a concentration of 40 to 70% in water, has numerous desirable properties. Thus, the gasoline and hydrogen peroxide can be separately stored at low pressures and only small volumes of each are required for each starting operation. Also, within said concentration range, the freezing point of the hydrogen peroxide is below —40° F. and the hydrogen peroxide is quite safe, its maximum temperature upon decomposition being less than 400° F. In addition, the hydrogen peroxide is relatively cheap, contributes to the heat of combustion of the hydrocarbon fuel, and provides water to prevent excessive combustion temperatures.

Other objects of the invention will become apparent upon reading the annexed detailed description in connection with the drawing which comprises a schematic view of a starting apparatus embodying the invention.

Referring to the drawing, the starting apparatus comprises a conventional single-stage impulse turbine 10 which is arranged to drive a shaft 12, of an engine to be started, through reduction gears 14, 16, 18, and 20 and a one-way clutch 22. The one-way clutch 22 is arranged so that the starter turbine 10 can drive the engine shaft 12 but so that the engine cannot drive said turbine. The turbine 10 is arranged to be driven by combustion gases generated in the combustion chamber 24 and supplied to a turbine nozzle box 25. The invention is primarily concerned with the elements of combustion supplied to the combustion chamber 24 and to the apparatus for controlling their rates of supply to said chamber.

In accordance with the invention, hydrogen peroxide and gasoline, or other hydrocarbon fuel, are supplied to the combustion chamber 24 for combustion therein. As herein used said fuel and the hydrogen peroxide are both termed a "combustion element." Gasoline is particularly suitable for use in an aircraft engine starter because it is readily available wherever airplanes are based and because of its high heat content. Hydrogen peroxide is particularly suitable for use with a hydrocarbon fuel because it contains the oxygen necessary for combustion of said fuel, thereby eliminating the need for an air compressor. The cost of the hydrogen peroxide is also relatively low and being a liquid it can be readily stored and handled. In addition, the hydrogen peroxide contributes to the heat released during combustion and furnishes water for preventing excessive combustion temperatures. In conventional gas turbine engines, in which compressed air is mixed with a hydrocarbon fuel for combustion, it is necessary to mix large amounts of excess air with the combustion gases in order that the temperature of the combustion gases be reduced to a point below the maximum safe operating temperature of the turbine rotor.

Hydrogen peroxide has a minimum freezing point of approximately —67° F. at approximately 60% concentration in water. At both higher and lower hydrogen peroxide concentrations, its freezing point is higher than —67° F. Between approximately 40 and 70% concentration, the freezing point of hydrogen peroxide in water is below —40° F., so that for most aircraft operation hydrogen peroxide can be used at any concentration within this range without any danger of it freezing.

Hydrogen peroxide decomposes quite readily into oxygen and water and in so doing it gives off large amounts of energy. The final temperature attained as the result of the decomposition of hydrogen peroxide depends on its initial concentration. At high concentrations said final temperature may be as high as 1300° F. Accordingly, high concentrations of hydrogen peroxide must be stored and handled with extreme care. However, concentrations of hydrogen peroxide in water below 70% are quite safe. Thus at concentrations below 65%, the maximum temperature reached upon decomposition is approximately 200° F. At concentrations of hydrogen peroxide above 65% said maximum temperature increases quite rapidly with increase in concentration of the hydrogen peroxide and at 70% concentration said temperature is approximately 400° F., which temperature is still relatively safe. Accordingly, the use of a combustion mixture comprising a hydrocarbon fuel, such as gasoline, and hydrogen peroxide in water, in concentrations between 40 and 70%, is particularly suitable for use in gas turbine engines intended for aircraft use.

Hydrogen peroxide is stored in the tank 26 from which it is supplied to the combustion chamber 24 through a passageway 28, said passageway having a valve 30, a restricted orifice 32 and valves 34, 36, and 38. Gasoline or other hydrocarbon fuel is stored in the tank 40 from which it is supplied to the combustion chamber 24 through a passageway 42, said passageway containing a valve 44, a manually controllable valve or restriction 46, and a valve 48. The combustion chamber 24 is provided with suitable igniter means 49 for igniting the combustion mixture of gasoline and hydrogen peroxide supplied thereto.

Carbon dioxide under pressure is applied to the surfaces of the hydrogen peroxide and gasoline, in their respective tanks, for forcing or pumping said liquids through their respective passageways 28 and 42 to the combustion chamber 24. For this purpose, a conduit 50 is connected to a suitable source of carbon dioxide under pressure from which said carbon dioxide is supplied to a pair of valves 52 and 54 under the control of a conventional pressure regulating valve 55. The pressure regulating valve 55 maintains a substantially constant pressure on its downstream side. The valves 30, 44, 52 and 54 and a fifth valve 56 are all pivotally connected to a link 58 which is adapted to be operated by a solenoid 62.

The solenoid 62 is connected to a suitable source of electric energy 64 through a switch 66. The switch 66, when closed, effects energization of the solenoid 62 to move the link 58, and the valves 30, 44, 52, 54, and 56 to their positions illustrated. In the positions illustrated, the valves 52 and 54 admit carbon dioxide under pressure from the conduit 50 to the tops of the hydrogen peroxide and fuel tanks through passages 68 and 70 respectively. In addition, the valves 30 and 44 are open for transmitting hydrogen peroxide and fuel, under said carbon dioxide pressure, from their respective tanks to the combustion chamber 24. When the solenoid 62 is de-energized, the link 58 is moved to its dotted line position thereby closing the hydrogen peroxide and fuel valves 30 and 44. In addition, de-energization of the solenoid 62 results in movement of the valve 52 to its dotted line position in which the top of the hydrogen peroxide tank 26 is vented through the conduit 68 and a vent opening 72. Similarly, the valve 54 is moved to its dotted line position to vent the top of the fuel tank 40 through the conduit 70 and a vent opening 74.

From the valves 30 and 44, the hydrogen peroxide and fuel flow through their respective orifices 32 and 46, said orifices forming part of a flow proportioning mechanism, indicated in its entirety by the dashed line 76. The flow proportioning mechanism 76 also includes the valve 48 in the passageway 42, said valve being connected, by means of rods 78 and 80, to the flexible diaphragms 82 and 84 for automatic control thereby. The flexible diaphragm 82 divides a housing 86 into a pair of chambers 88 and 90, the chamber 88 being connected by a conduit 92 in communication with the passageway 28 immediately downstream of its restricted orifice 32. The flexible diaphragm 84 divides a housing 94 into a pair of chambers 96 and 98, the chamber 98 being connected by a conduit 100, in communication with the passageway 42 immediately downstream of the restricted orifice 46. The same fluid pressure acts on the other sides of the diaphragms 82 and 84. Thus, when the solenoid 62 is energized to supply hydrogen peroxide and fuel to the combustion chamber 24, the valve 56 admits carbon dioxide from the supply conduit 50 through a conduit 102 to the chambers 90 and 96. When the solenoid 62 is de-energized to shut off said hydrogen peroxide and fuel, the chambers 90 and 96 are both vented by the valve 56 through the conduit 102 and a vent opening 104. Accordingly, since the diaphragms 82 and 84 have the same area and are connected by the rod 80, the fluid pressure in the chamber 90 always balances the fluid pressure in the chamber 96.

The arrangement of the flow proportioning mechanism 76 is such that the pressure of the hydrogen peroxide in the passageway 28 immediately downstream of the restriction 32 acts on the diaphragm 82 to urge the valve 48 in a closing direction while the pressure of the fuel immediately downstream of the valve 46 acts on the diaphragm 84 to urge said valve in an opening direction. The flexible diaphragms 82 and 84 have the same effective area so that the valve 48 automatically maintains the pressure of the fuel immediately downstream of the variable restriction 46 equal to the pressure of the hydrogen peroxide immediately downstream of the fixed restriction 32. Except for small differences in the head of liquid, the same liquid pressure exists on the upstream sides of said restrictions 32 and 46 since the carbon dioxide pressure in the hydrogen peroxide tank 26 is the same as that in the fuel tank 40. Accordingly, the valve 48 automatically operates to maintain the fluid pressure drop across the variable restriction 46 equal to that across the fixed restriction 32. Therefore, the proportion of hydrogen peroxide and fuel supplied to the combustion chamber 24 depends on the relative size of the restricted openings 32 and 46 and, for any given setting of the variable restriction 46, the valve 48 will automatically operate to maintain a predetermined ratio of fuel flow through the passageway 42 to the flow of hydrogen peroxide through the passageway 28. This ratio can be increased or decreased by an opening or closing adjustment, respectively, of the variable restriction 46—as for example would be desirable if the concentration of the hydrogen peroxide were respectively increased or decreased.

When hydrogen peroxide and fuel are being supplied to the combustion chamber 24, the pressure immediately downstream of the restrictions 32 and 46 is always less than the equal pressures existing immediately upstream of said restrictions. Accordingly no matter how high the hydrogen peroxide pressure is downstream of the restriction 32, the valve 48 can always move in a closing direction to provide an equal fuel pressure downstream of the variable restriction 46. However, in the absence of the valve 34, a situation might arise where the pressure downstream of the restriction 32 is so low that, even if the valve 48 were fully open, the pressure downstream of the restriction 46 would be higher. To prevent this unbalance of the flow proportioning mechanism 76, the valve 34 is provided to maintain at least a predetermined back pressure on the fixed restriction 32. For this purpose, the valve 34 is connected to a flexible diaphragm 106 dividing a housing 108 into a pair of chambers 110 and 112. The chambers 110 and 112 are connected to the upstream and downstream sides respectively of the valve 34 so that the pressure difference across said valve urges said valve in an opening direction against a spring 114. With this arrangement the spring 114 insures a predetermined pressure drop across the valve 34 whenever hydrogen peroxide flows therethrough, thereby preventing the hydrogen peroxide pressure, on the downstream side of the restriction 32, from falling below a predetermined value.

The two diaphragms 82 and 84 obviously could be replaced by a single diaphragm having one side communicating with the conduit 100 and having its other side communicating with the conduit 92. With such an arrangement, however, if said single diaphragm should break or leak, premature mixing and combustion of the fuel and hydrogen peroxide might take place. With the double diaphragm construction illustrated, breakage of either the diaphragm 82 or the diaphragm 84 results only in mixture of fuel or hydrogen peroxide with the inert carbon dioxide.

Torque outputs of the starter turbine 10, below the design value, will crank the engine shaft 12 too slowly while excessive torque outputs of the turbine 10 will overload the gear teeth in the power plant. Accordingly, it is essential to provide some means for controlling the torque output of the starter turbine 10. The torque output of an impulse turbine depends not only on the mass rate of flow of the turbine motive fluid, but also on the change in momentum of that fluid at the rotor blades of the turbine. This change in momentum varies with changes in the tangential velocity or speed of rotation of said rotor blades, so that means are provided for compensating for this change in momentum with changes in turbine speed. It can be shown that the torque output of a single stage impulse turbine will remain substantially constant if the pressure of its motive fluid, upstream of the turbine rotor blades, is varied as the square of the speed of said turbine, provided the temperature of said motive fluid remains substantially constant. Since the ratio of the rates at which hydrogen peroxide and fuel are supplied to the combustion chamber 24 is maintained substantially constant by the flow proportioning mechanism 76, the temperature within the combustion chamber 24 will remain substantially constant provided the concentration of the hydrogen peroxide and the initial temperatures of the hydrogen peroxide and fuel remain substantially constant.

The torque output of the starter turbine 10 is regulated by the valve 38 under the control of a speed responsive mechanism 110. In addition, said speed responsive mechanism 110 controls the valve 36 for preventing overspeeding of the starter turbine 10 during no-load operation—for example after the power plant has started.

The speed responsive mechanism 110 comprises a fixed housing 112 to which a suitable fluid under pressure is supplied. Preferably, carbon dioxide from the supply line 50 is used as said fluid. As illustrated, when the solenoid 62 is energized, carbon dioxide under pressure is admitted by the valve 56 into the housing 112 via the conduit 102 and a conduit 115. A member 116 is rotatably mounted within the housing 112 by trunnions 118 and 120. The rotatable member 116 is drivably connected to the turbine 10 by means diagrammatically indicated by the dashed line 122. In addition, the rotatable member 116 has a bore 124 therein at right angles to its axis of rotation and a piston 126 is slidable within said bore. An abutment member 128 closes one end of said bore and limits movement of the piston 126 toward said bore end so that, when the member 116 rotates, the centrifugal force acting on the piston 126 always urges said piston toward the other or head end of said bore.

The piston 126 has an annular groove 130 which communicates with the head end of said piston through passages 132 and 134. Upon movement of the piston 126 toward said head end, its groove 130 registers with a passage 136 in the rotatable member 116, whereupon the fluid pressure within the housing 112 is admitted to the head end of the bore 124, through the passages 132 and 134, until said pressure is sufficient to balance the centrifugal force acting on the piston 126.

The end of the bore 124 adjacent the abutment 129 is vented through passages 140 and 142. In addition, movement of the piston 126 toward said abutment moves the annular piston groove 130 out of registry with the fluid pressure passage 136 and into registry with the vent passage 142. Accordingly, whenever the speed of rotation of the member 116 decreases the fluid pressure acting against the head end of its piston 126 moves said piston toward its abutment end whereupon the annular piston groove 130 registers with the vent passage 142 thereby relieving some of said pressure until said pressure and the centrifugal force acting on the piston are again in balance. With this construction, when the member 116 is rotated and a fluid pressure is supplied to the housing 112, the piston 126 automatically assumes a position such that the centrifugal force acting thereon is balanced by the fluid pressure acting against the head end of the piston 126. The centrifugal force acting on the piston 126 is proportional to the square of the speed of rotation of the member 116 within which the piston is slidable. Therefore, since the rotatable member 116 is driven by the turbine 10, the fluid pressure acting against the head end of the piston 126 varies as the square of the speed of rotation of the turbine 10 whereby the mechanism 110 provides a fluid pressure signal which is proportional to the square of the speed of said turbine.

In the balanced or neutral position of the piston 126 its groove 130 is disposed between the fluid pressure passage 136 and the vent passage 142 so that slight radially outward movement of said piston moves its groove 130 into registry with the fluid pressure passage 136 and slight radially inward movement moves said groove into registry with the vent passage 142. Therefore, during operation of the starting apparatus, the range of movement of the piston 126 is small so that said annular groove 130 is continually in communication with a passageway 144 extending through the trunnion 118, said passageway 144 communicating with a conduit 146.

The conduit 146 opens into one side of a housing 148 having a flexible diaphragm 150 extending thereacross. The other side of said housing is vented through an opening 152 and said diaphragm 150 is connected by a rod 154 to the valve 36. A spring 158 urges the valve 36 toward its open position. The fluid pressure acting against the head end of the piston 126 is transmitted therefrom through the passages 132 and 134, the piston groove 130, the passage 144 and the conduit 146 to the diaphragm 150 for urging the valve 36 in a closing direction against the spring 158. The arrangement is such that the valve 36 remains in its full open position unless the speed of the turbine 10 becomes excessive. When the speed of said turbine exceeds a predetermined high value, the fluid pressure acting against the diaphragm 150 becomes sufficient to move the valve 36 in a closing direction against the spring 158, thereby reducing the rate at which hydrogen peroxide is supplied to the combustion chamber 24. Closing adjustment of the valve 36 not only results in a reduction in the rate at which hydrogen peroxide is supplied to the combustion chamber 24 but the flow proportioning mechanism 76 effects a corresponding reduction in the fuel flow to said chamber thereby decreasing the speed of the turbine 10.

The valve 38 is also controlled by the speed responsive mechanism 110. For this purpose, the valve 38 is connected by a rod 160 to a flexible diaphragm 162 which divides a housing into a pair of opposed chambers 164 and 166. A spring 166 urges the valve 38 in an opening direction. The chamber 164 communicates with the combustion chamber 24 through a conduit 170 whereby the pressure within said combustion chamber is transmitted through the conduit 170 as a pressure signal to the chamber 164 where said pressure acts against the diaphragm 162 to urge the valve 38 in a closing direction. The chamber 166 communicates with the fluid pressure acting against the head end of the piston 126 through a conduit 172, the conduit 146, the passage 144, the annular piston groove 130, and the passages 132 and 134. Accordingly, the fluid pressure acting against the head end of the piston 126 also acts against the diaphragm 162 to urge the valve 38 in an opening direction. Substantially coincidental with any change in the rate of flow of hydrogen peroxide to the combustion chamber 24 as a result of operation of the valve 38, the valve 48 of the flow proportioning mechanism 76 operates to effect a similar change in the flow of fuel to said chamber. Therefore, the valve 38, together with the flow proportioning mechanism 76, operates to control the rate at which hydrogen peroxide and fuel are supplied to the combustion chamber 24 so that, except for the force of the spring 168, the pressure within the combustion chamber 24 is maintained substantially equal to the fluid pressure acting against the head of the piston 126. This latter fluid pressure is proportional to the square of the speed of the turbine 10. Accordingly, the pressure automatically maintained within the combustion chamber 24, by the valve 38, is equal to an initial pressure, determined by the spring 168, plus a pressure which is a function of or varies substantially as the square of the speed of the turbine 10.

It is proposed to provide an initial pressure of 60 p. s. i., above atmosphere, in the combustion chamber 24 when the speed of the turbine is zero. This pressure is determined by the spring 168. In order to discharge fuel and hydrogen peroxide into the combustion chamber 24, the pressure of the carbon dioxide should be such as to supply the fuel and hydrogen peroxide to said combustion chamber at a pressure above the combustion chamber pressure—for example at pressures from 10 to 20 atmospheres. Obviously the initial pressure in the combustion chamber 24 and the pressure at which fuel and hydrogen peroxide are supplied to said chamber are subject to considerable variation.

When the starting apparatus is used for cranking an aircraft engine, the starter turbine 10, the reduction gear connecting said turbine to the engine shaft 12, the combustion chamber 24, and the speed responsive mechanism 110 with the valves controlled thereby, must all be mounted on the aircraft. The flow proportioning mechanism 76, the tanks 26 and 40, the supply of carbon dioxide, and the solenoid operated valves, may also be mounted on the aircraft or this latter mechanism may be mounted on a suitable ground vehicle.

If this latter portion of the starting apparatus is mounted on the aircraft, it may be connected to a plurality of starter turbines 10 by suitable valves. In addition, the fuel tank 40 is preferably filled with gasoline from the aircraft tanks by means of a conduit 174 and a low pressure pump (not shown) on the aircraft. A check valve 176 is provided in the conduit 174 to prevent reverse flow of gasoline out from the tank 40 through said conduit. The tank 40 is also provided with a flexible diaphragm 178 extending thereacross to prevent the tank 40 from being filled to overflowing.

Where, however, the flow proportioning mechanism 76, the tanks 26 and 40, the source of carbon dioxide, and the solenoid operated valves, are to be mounted on a ground vehicle then, in order to complete the apparatus for starting an aircraft engine, the portions of the passages 28 and 42 and the conduit 115 on the ground vehicle must first be connected to the remaining portions of said passages and conduit on the aircraft. Obviously, however, the operation of the starting apparatus is the same whether all or only a portion of said apparatus is mounted on the aircraft.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A fuel system for a gas turbine engine having rotor for providing engine starting torque; said system comprising means for supplying a first combustion element to the combustion chamber of said engine; means for supplying a second combustion element to the combustion chamber of said engine, one of said combustion elements being a hydrocarbon fuel and the other of said combustion elements being hydrogen peroxide of 40 to 70% concentration in water; first regulating means operable to vary the flow of one of said combustion elements to said combustion chamber; means responsive to the speed of said rotor for providing a first force which increases with increase in said speed; means operatively connected to said first regulating means and subjected to said first force for urging said regulating means in a flow increasing direction and subjected to a second force proportional to the pressure in said combustion chamber for urging said first regulating means in a flow decreasing direction; second regulating means operable to vary the flow rate at which the other combustion element is supplied to said combustion chamber; and means for effecting operation of said second regulating means substantially coincidental with operation of said first regulating means such that a change in the rate of flow of said one combustion element resulting from operation of said first regulating means is accompanied by a similar change in the rate of flow of said other combustion element.

2. A fuel system for a gas turbine engine having a combustion chamber; means for regulating the rate of supply of a combustion element to said combustion chamber; means providing a first force which increases with increase in speed of said engine; means providing a second force which increases with increase in pressure in said combustion chamber; and means for controlling said regulating means such that an increase of said first force and a decrease of said second force both tend to effect an increase in the rate of supply of said combustion element.

3. Engine starting apparatus comprising a gas turbine having a combustion chamber and having a rotor for providing engine starting torque; means for regulating the flow of a combustion element to said chamber; means providing a first force which increases with increase in the speed of said turbine rotor; means operatively connected to said flow regulating means and subjected to said first force for urging said flow regulating means in a flow increasing direction; and means providing a second force, said operatively connected means also being subjected to said second force for urging said flow regulating means in a flow decreasing direction.

4. Engine starting apparatus comprising a gas turbine having a combustion chamber and having a rotor for providing engine starting torque; means for regulating the flow of a combustion element to said chamber; means responsive to the speed of said rotor for providing a first force which increases with increase in said speed; and means operatively connected to said flow regulating means and subjected to said first force for urging said flow regulating means in a flow increasing direction and subjected to a second force which increases with increase of the pressure within said chamber for urging said flow regulating means in a flow decreasing direction.

5. Engine starting apparatus comprising a single-stage impulse gas turbine having a combustion chamber and having a rotor for providing engine starting torque; means for regulating the flow of the combustion elements to said chamber; mechanism including means drivably connected to said rotor for providing a first force proportional to the square of the speed of said rotor; and means operatively connected to said flow regulating means and subjected to said first force for urging said flow regulating means in a flow increasing direction and subjected to a second force proportional to the pressure within said chamber for urging said flow regulating means in a flow decreasing direction.

6. Engine starting apparatus comprising a gas turbine having a combustion chamber and having a rotor for providing engine starting torque; means for regulating the flow of a combustion element to said chamber; means responsive to the speed of said rotor for providing a fluid pressure proportional to the square of said speed; means for urging said flow regulating means in a flow increasing direction with a first force proportional to said fluid pressure; and means for urging said flow regulating means in a flow decreasing direction with a second force proportional to the combustion chamber pressure.

7. Engine starting apparatus as recited in claim 6 and including yieldable means biasing said flow regulating means in a flow increasing direction.

8. Engine starting apparatus comprising a gas turbine having a combustion chamber and having a rotor for providing engine starting torque; means for regulating the flow of a combustion element to said chamber; a rotatable member drivably connected to said rotor, said rotatable member having a bore transverse to its axis of rotation; a piston slidable along said bore and urged in one direction therealong by the centrifugal force acting on said piston; means including said rotatable member and piston providing a fluid pressure balancing the centrifugal force acting on said piston; means for urging said flow regulating means in a flow increasing direction with a force proportional to said fluid pressure; and means for urging said flow regulating means in a flow decreasing direction with a force proportional to the combustion chamber pressure.

9. Engine starting apparatus comprising a gas turbine having a combustion chamber and having a rotor for providing engine starting torque; means for regulating the flow of a combustion element to said chamber; means responsive to the speed of said rotor for providing a first force proportional to the square of said speed; means providing a second force proportional to the pressure within said chamber; means movable in response to relative changes in said forces; and means operatively connecting said responsive means to said flow regulating means such that an increase in said first force and a decrease in said second force both tend to effect an increase in said flow.

10. Engine starting apparatus comprising a gas turbine having a combustion chamber and having a rotor for providing engine starting torque; a container for hydrogen peroxide; a container for a hydrocarbon fuel, said hydrogen peroxide and fuel each being a combustion element for combustion in said chamber; means for imposing a gas pressure on the combustion element in each said container; first regulating means operable to vary the flow rate at which one of said combustion elements is supplied to said combustion chamber by the gas pressure in the container of said one combustion element; means responsive to the speed of said rotor and to the combustion chamber pressure and operatively connected to said first regulating means such that an increase of said speed and a decrease of said combustion chamber pressure each tends to produce an increase in the rate of flow of said first combustion element; second regulating means operable to vary the flow rate at which the other combustion element is supplied to said combustion chamber by the gas pressure in the container of said other combustion element; and means for effecting operation of said second regulating means substantially coincidental with operation of said first regulating means such that a change in the rate of flow of said one combustion element resulting from operation of said first regulating means is accompanied by a similar change in the rate of flow of said other combustion element.

11. Engine starting apparatus comprising a gas turbine having a combustion chamber and having a rotor for providing engine starting torque; means for supplying first and second combustion elements to said combustion chamber for combustion therein, one of said combustion elements being a hydrocarbon fuel and the other of said combustion elements being hydrogen peroxide of 40 to 70% concentration in water; mechanism including means drivably connected to said rotor for providing a fluid pressure proportional to the square of the speed of the rotor; first regulating means controlled by said fluid pressure and by the pressure in said combustion chamber and operable to vary the rate of supply of one of said combustion elements to said combustion chamber; and second regulating means operable substantially coincidental with operation of said first regulating means to vary the rate of supply of the other combustion element to said combustion chamber, the operation of said first and second regulating means being such that an increase of said speed proportional pressure and a decrease of said combustion chamber pressure each tends to produce an increase in the rate of supply of each of said combustion elements to said combustion chamber.

12. Engine starting apparatus comprising a gas turbine having a combustion chamber and having a rotor for providing engine starting torque; means for supplying first and second combustion elements to said combustion chamber, said elements forming a combustible mixture within said chamber for combustion therein; first regulating means operable to vary the flow rate at which one of said combustion elements is supplied to said combustion chamber; means responsive to the speed of said rotor for providing a first force which increases with increase in said speed; means operatively connected to said first regulating means and subjected to said first force for urging said regulating means in a flow increasing direction and subjected to a second force proportional to the pressure in said combustion chamber for urging said first regulating means in a flow decreasing direction; second regulating means operable to vary the flow rate at which the other combustion element is supplied to said combustion chamber; and means for effecting operation of said second regulating means substantially coincidental with operation of said first regulating means such that a change in the rate of flow of said one combustion element resulting from operation of said first regulating means is accompanied by a proportionate change in the rate of flow of said other combustion element.

13. Engine starting apparatus comprising a gas turbine having a combustion chamber and having a rotor for providing engine starting torque; means for supplying first and second combustion elements to said chamber, said elements forming a combustible mixture within said chamber for combustion therein; means for automatically varying the rate of supply of said first combustion element to said chamber in proportion to the rate of supply of said second combustion element to said chamber; means for regulating the rate of supply of said second combustion element to said combustion chamber; means responsive to the speed of said rotor for providing a first force proportional to the square of the speed of said rotor; and means operatively connected to said flow regulating means and subjected to said first force for urging said flow regulating means in a flow increasing direction and subjected to a second force proportional to the pressure within said chamber for urging said flow regulating means in a flow decreasing direction.

14. Engine starting apparatus comprising a gas turbine having a combustion chamber and having a rotor for providing engine starting torque; regulating means operable to vary the flow of a combustion element to said combustion chamber; means providing a signal which is a measure of the speed of said rotor; means providing a signal which is a measure of the pressure in said combustion chamber; and means responsive to said signals and operatively connected to said regulating means such that an increase of said speed and a decrease of said pressure each tends to cause an increase in the rate of flow of said combustion element to said chamber.

15. Engine starting apparatus comprising a gas turbine having a combustion chamber and having a rotor for providing engine starting torque; first regulating means operable to vary the flow of a first combustion element to said combustion chamber; means providing a signal which is a measure of the speed of said rotor; means providing a signal which is a measure of the pressure in said combustion chamber; means responsive to said signals and operatively connected to said first regulating means for effecting operation of said first regulating means such that an increase of said speed and a decrease of said pressure each tends to cause an increase in the rate of flow of said first combustion element; second regulating means operable to vary the flow of a second combustion element to said chamber; and means for effecting operation of said second regulating means substantially coincidental with operation of said first regulating means such that a change in the rate of flow of said first combustion element resulting from operation of said first regulating means is accompanied by a proportionate change in the rate of flow of said second combustion element.

CHARLES S. JEWETT.

REFERENCES CITED

The following references are of record in the file of this patent:

UNITED STATES PATENTS

| Number | Name | Date |
|---|---|---|
| 929,503 | Selden | July 27, 1909 |
| 1,052,588 | Janicki | Feb. 11, 1913 |
| 1,154,609 | Bruniquel | Sept. 28, 1915 |
| 2,093,008 | Egerton | Sept. 14, 1937 |
| 2,154,572 | Lansing | Apr. 18, 1939 |
| 2,206,723 | Graham et al. | July 2, 1940 |
| 2,325,618 | Lysholm | Aug. 3, 1943 |
| 2,351,750 | Fawkes | June 20, 1944 |
| 2,382,564 | Haverstick | Aug. 14, 1945 |
| 2,398,201 | Young et al. | Apr. 9, 1946 |

OTHER REFERENCES

"Power Plant Engineering," Jan. 1947, pp. 78 and 79.

"Coast Artillery Journal," Jan.-Feb. 1948, pp. 27 and 28.